United States Patent
Iwamoto et al.

(10) Patent No.: US 8,838,258 B2
(45) Date of Patent: Sep. 16, 2014

(54) IN-VEHICLE APPARATUS AND FRONT PANEL

(75) Inventors: Takao Iwamoto, Tochigi (JP); Hochan Lim, Pusan (KR); Hyeoung-Woo Kim, Kyoungnam (KR)

(73) Assignees: Sony Corporation, Tokyo (JP); Sony Electronics of Korea Corporation, Masan (KR)

( * ) Notice: Subject to any disclaimer, the term of this patent is extended or adjusted under 35 U.S.C. 154(b) by 1171 days.

(21) Appl. No.: 11/616,481

(22) Filed: Dec. 27, 2006

(65) Prior Publication Data

US 2007/0172077 A1    Jul. 26, 2007

(30) Foreign Application Priority Data

Dec. 28, 2005  (JP) .................................. 2005-380372

(51) Int. Cl.
- *G06F 17/00* (2006.01)
- *B60R 11/02* (2006.01)
- *B60R 11/00* (2006.01)

(52) U.S. Cl.
CPC ........... *B60R 11/02* (2013.01); *B60R 2011/008* (2013.01); *B60R 11/0264* (2013.01)
USPC ......................................................... 700/94

(58) Field of Classification Search
USPC ......................................................... 700/94
See application file for complete search history.

(56) References Cited

U.S. PATENT DOCUMENTS 6,483,428 B1 * 11/2002 Fish et al. .................. 340/425.5
2002/0084700 A1   7/2002 Deleeuw

FOREIGN PATENT DOCUMENTS

| DE | 101 12 673 A1 | 10/2001 |
| JP | 7-319500 | 12/1995 |
| JP | 09-261749 | 10/1997 |
| JP | 2002-149195 | 5/2002 |

OTHER PUBLICATIONS

Office Action issued May 17, 2011, in Japanese Patent Application No. 2005-380372.

* cited by examiner

*Primary Examiner* — Andrew C Flanders
(74) *Attorney, Agent, or Firm* — Oblon, Spivak, McClelland, Maier & Neustadt, L.L.P.

(57) ABSTRACT

An in-vehicle apparatus includes a reproduction apparatus main body to be mounted in a vehicle, and a front panel which is detachable with respect to the reproduction apparatus main body. The front panel includes a first connecting unit that is connected to the reproduction apparatus main body, a memory that is connected to the first connecting unit, a second connecting unit that is connected to the memory, and is connected to a signal input/output apparatus, and a control unit that is arranged between the memory and the second connecting unit, and controls inputting and outputting of a signal in the second connecting unit with respect to the memory.

6 Claims, 3 Drawing Sheets

IN-VEHICLE APPARATUS AND FRONT PANEL

CROSS REFERENCES TO RELATED APPLICATIONS

The present invention contains subject matter related to Japanese Patent Application JP2005-380372 filed in the Japanese Patent Office on Dec. 28, 2005, the entire contents of which being incorporated herein by reference.

BACKGROUND OF THE INVENTION

1. Field of the Invention

The present invention relates to an in-vehicle apparatus and a front panel.

2. Description of the Related Art

In the past, there has been proposed an in-vehicle sound reproduction apparatus that has its commander for adjusting the sound reproduction state detachably configured, the commander having built therein a semiconductor memory (refer to Jpn. Pat. Appln. Laid-Open Publication No. 2002-149195).

SUMMARY OF THE INVENTION

On the other hand, in above-described in-vehicle sound reproduction apparatus, a rotary commander for adjusting the sound reproduction state is employed as a detachable component with respect to the main body of the reproduction apparatus. Accordingly, it is necessary to employ a mechanical structure in which the rotary structure of the commander and the detachably mounting structure of the commander with respect to the main body of the reproduction apparatus are made to operate individually. As a result, when employing the in-vehicle sound reproduction apparatus, the number of parts becomes large as well as the mechanical structure becomes complicated.

In above-described in-vehicle sound reproduction apparatus, even if the commander is detachable, the other front panel component remains mounted. Accordingly, in case the user of a vehicle having mounted therein the in-vehicle sound reproduction apparatus parks the vehicle and gets away therefrom, the in-vehicle sound reproduction apparatus itself is in danger of being stolen.

It is therefore desirable to overcome the above-mentioned drawbacks by providing an in-vehicle apparatus and a front panel which are of uncomplicated configuration and can improve usability.

According to an embodiment of the present invention, there is provided an in-vehicle apparatus that includes a reproduction apparatus main body to be mounted in a vehicle, and a front panel which is detachable with respect to the reproduction apparatus main body, the front panel including: a first connecting unit that is connected to the reproduction apparatus main body; a memory that is connected to the first connecting unit; a second connecting unit that is connected to the memory, and is connected to a signal input/output apparatus; and a control unit that is arranged between the memory and the second connecting unit, and controls inputting and outputting of a signal in the second connecting unit with respect to the memory.

In the in-vehicle apparatus, in case a signal input/output apparatus is connected to the second connecting unit of the front panel, the control unit writes a signal which is input from the signal input/output apparatus through the second connecting unit to the memory in accordance with the signal and a write instruction therefor. On the other hand, the control unit reads out a corresponding signal in accordance with a read instruction which is input from the signal input/output apparatus through the second connecting unit to output thus read out signal to the signal input/output apparatus.

Accordingly, the in-vehicle apparatus is configured such that the front panel which is dismounted from the reproduction apparatus main body can be preserved at a place distant from a vehicle so as to prevent the front panel from being stolen. Furthermore, in case of preserving the front panel, not only the front panel can be preserved but also the front panel can write and read out a signal to be reproduced by the reproduction apparatus main body to and from the memory in the front panel. In this way, according to the in-vehicle apparatus, since the front panel is a detachable component with respect to the reproduction apparatus main body, the front panel can be used as the antitheft as well as portable memory without making the mechanical structure of the detachable component operate individually or differently from the other structure.

According to an embodiment of the present invention, there is also provided a front panel which is detachable with respect to a reproduction apparatus main body to be mounted in a vehicle, the front panel including: a first connecting unit that is connected to the reproduction apparatus main body; a memory that is connected to the first connecting unit; a second connecting unit that is connected to the memory, and is connected to a signal input/output apparatus; and a control unit that is arranged between the memory and the second connecting unit, and controls inputting and outputting of a signal in the second connecting unit with respect to the memory.

In the front panel, in case a signal input/output apparatus is connected to the second connecting unit, the control unit writes a signal which is input from the signal input/output apparatus through the second connecting unit to the memory in accordance with the signal and a write instruction therefor. On the other hand, the control unit reads out a corresponding signal in accordance with a read instruction which is input from the signal input/output apparatus through the second connecting unit to output thus read out signal to the signal input/output apparatus.

Accordingly, the front panel which is dismounted from the reproduction apparatus main body can be preserved at a place distant from a vehicle so as to prevent the front panel from being stolen. Furthermore, in case of preserving the front panel, not only the front panel can be preserved but also the front panel can write and read out a signal to be reproduced by the reproduction apparatus main body to and from the memory in the front panel. In this way, since the front panel is a detachable component with respect to the reproduction apparatus main body, the front panel can be used as the antitheft as well as portable memory without making the mechanical structure of the detachable component operate individually or differently from the other structure.

According to the present invention, since the front panel is a detachable component with respect to the reproduction apparatus main body, the front panel can be used as the antitheft as well as portable memory without making the mechanical structure of the detachable component operate individually or differently from the other structure, which makes it possible to provide an in-vehicle apparatus and a front panel which are of uncomplicated configuration and can improve usability.

The nature, principle and utility of the invention will become more apparent from the following detailed description when read in conjunction with the accompanying drawings in which like parts are designate by like reference numerals or characters.

DETAILED DESCRIPTION OF THE PREFERRED EMBODIMENTS

The present invention will further be described below with reference to the accompanying drawings.

(1) Entire Configuration of the In-vehicle Apparatus in this Embodiment

Figure 1:
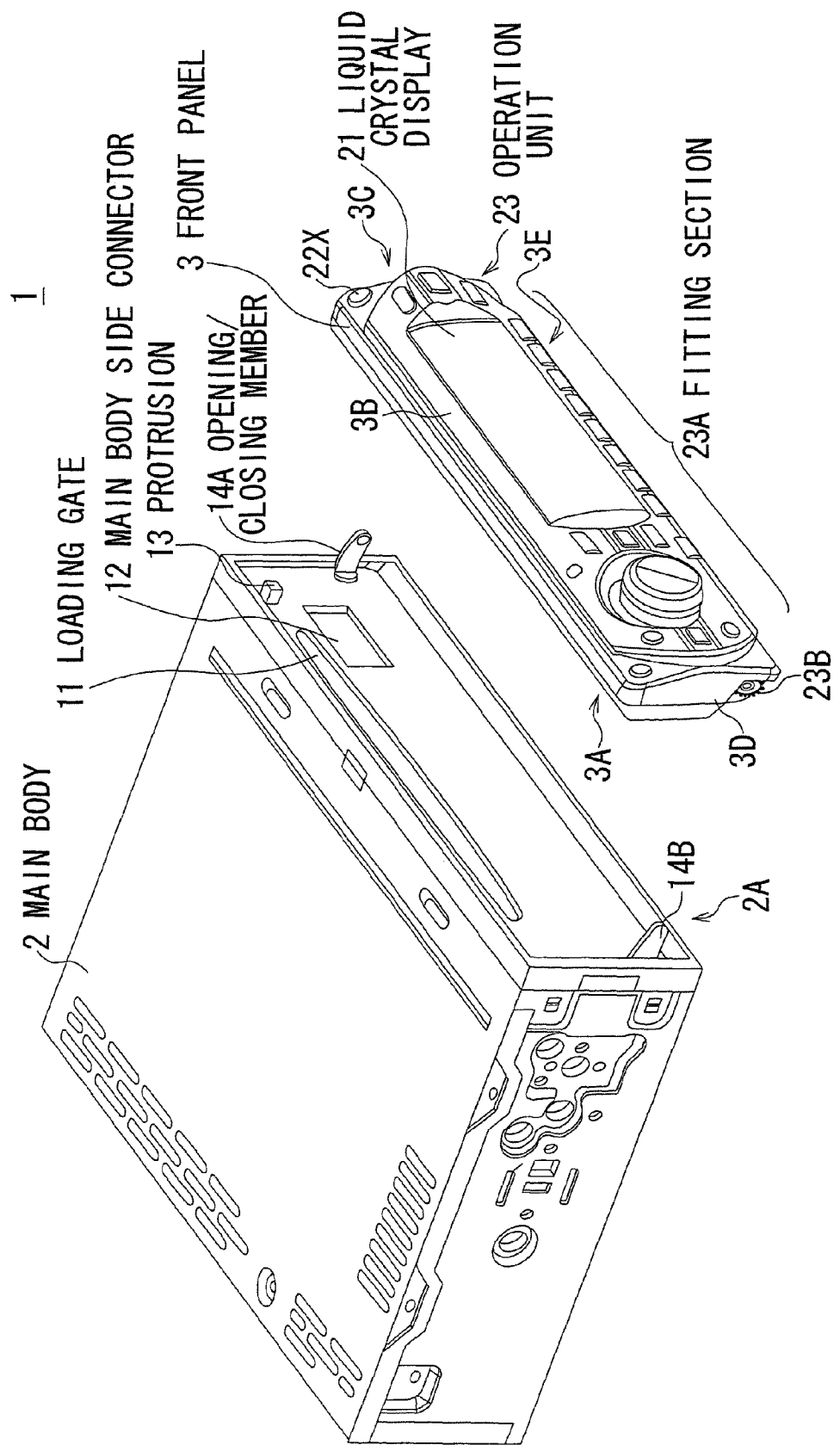
FIG. 1 shows a perspective view of the in-vehicle reproduction apparatus in the embodiment.

FIG. 1 shows a perspective view of a sound reproduction apparatus (referred to as an in-vehicle reproduction apparatus, hereinafter) 1 which is to be mounted in a vehicle. The in-vehicle reproduction apparatus 1 includes a main body 2, and a front panel 3 that is detachable with respect to the main body 2.

The main body 2 is substantially in the form of a rectangular parallelepiped, and a surface (referred to as a main body side mounting surface, hereinafter) 2A onto which the front panel 3 is to be mounted is provided with a loading gate 11 for loading an optical disc or a Digital Versatile Disc (DVD), a Compact Disc (CD), a Blue-ray Disc (BD, Registered Trademark), etc., a main body side connector 12, a protrusion 13, and panel opening/closing members 14A, 14B.

The panel opening/closing members 14A, 14B have their open ends rotatably formed from a direction parallel with respect to the main body side mounting surface 2A to a direction forming a predetermined angle with respect to the main body side mounting surface 2A with their fixed ends working as the axes.

On the other hand, the front panel 3 is substantially in the form of a flat rectangular parallelepiped, and a surface (referred to as a panel side mounting surface, hereinafter) 3A which is to be mounted onto the main body 2 is provided with a panel side connector, not shown, which corresponds to the main body side connector 12.

Furthermore, a surface (referred to as a panel front surface) 3B that is opposite with the panel side mounting surface 3A is provided with, at around the center thereof, a liquid crystal display 21. At the lower side and the right and left side of the liquid crystal display 21, there is arranged an operation unit 22 composed of a plurality of operation keys for carrying out various functions related to the reproduction processing in the in-vehicle reproduction apparatus 1.

Figure 2:
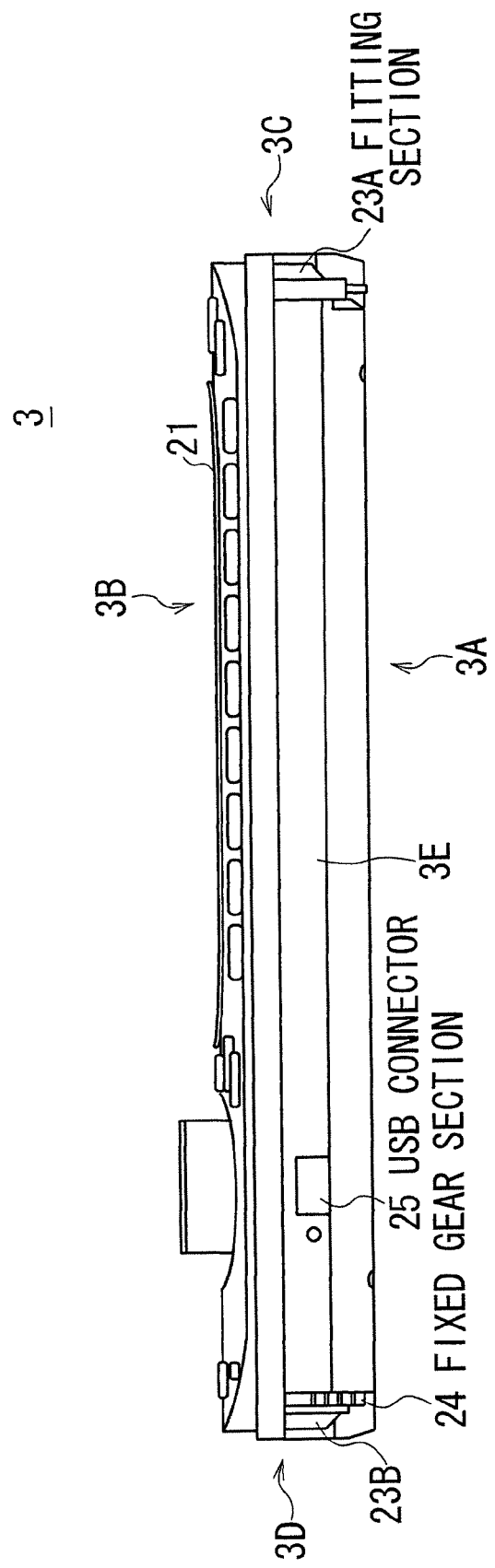
FIG. 2 shows a schematic view of the front panel.

Moreover, as shown in FIG. 1 and FIG. 2, at the lower parts of side surfaces 3C, 3D located at the ends of the front panel 3 in the longitudinal direction, there are arranged fitting sections 23A, 23B into which the open ends of the panel opening/closing members 14A, 14B of the main body 2 are fit respectively, and a fixed gear section 24 in the form of a circular arc whose center corresponds to the fitting position is arranged in the vicinity of one of the fitting sections or the fitting section 23B.

Moreover, of surfaces located at the ends of the front panel 3 in a direction perpendicular to the longitudinal direction, a surface (referred to as a lower surface, hereinafter) 3E which is located under the liquid crystal display 21 is provided with a Universal Serial Bus (USB) connector 25. The front panel 3 has arranged therein a flash memory, not shown.

In the in-vehicle reproduction apparatus 1, in case the front panel 3 is mounted to the main body 2 with the main body side mounting surface 2A and the panel side mounting surface 3A facing with each other, the panel opening/closing members 14A, 14B of the main body 2 are fit into the fitting sections 23A, 23B of the front panel 3, and terminals of the main body side connector 12 and corresponding terminals of the panel side connector, not shown, are electrically connected.

In this case, the in-vehicle reproduction apparatus 1 is so configured as to reproduce contents data such as sound or acoustic data, moving picture data, or still picture data which is recorded on an optical disc loaded from the loading gate 11 or in a flash memory, not shown, arranged in the front panel 3 according to the operation by the operation unit 22, and display the operation contents by the operation unit 22 and the reproduction state of the contents data on the liquid crystal display 21.

Furthermore, when an open button 22X located on the front panel 3 is pushed, the open button 22X presses the protrusion 13 of the main body 2. When the protrusion 13 is pressed, the panel opening/closing members 14A, 14B have their open ends made to rotate with the fixed ends thereof working as the axes. In response to the rotation, with the fitting sections 23A, 23B into which the open ends of the panel opening/closing members 14A, 14B are fit being the axes, the front panel 3 is made to slant stepwise in a direction of drawing away from the main body side mounting surface 2A of the main body 2 according to the engagement state of the fixed gear section 24 with respect to the gear groove. As a result, the main body side mounting surface 2A of the main body 2 is exposed.

In this sate, the in-vehicle reproduction apparatus 1 can unload a loaded optical disc from the loading gate 11, and can load an optical disc from the loading gate 11. On the other hand, an optical disc may be unloaded manually by arranging an eject button on the main body side mounting surface 2A, or may be unloaded automatically in conjunction with the operation of pressing the protrusion 13.

In the in-vehicle reproduction apparatus 1, in case the front panel 3 is mounted to the main body 2, being arranged on the lower surface 3E located under the liquid crystal display 21, the USB connector 25 is located in the blind side when viewed from passengers of a vehicle. Accordingly, the in-vehicle reproduction apparatus 1 is so configured as to look neat in appearance as if the USB connector 25 is not arranged when the front panel 3 is used.

On the other hand, the in-vehicle reproduction apparatus 1 is configured such that, in case the front panel 3 is dismounted from the main body 2, the front panel 3 can be preserved at a place distant from a vehicle so as to prevent the front panel 3 from being stolen.

In this case, the front panel 3 is so configured as to record contents data transferred from a terminal apparatus, not shown, such as a personal computer or a Personal Digital Assistant (PDA) which is connected to the USB connector 25 through a USB cable, not shown, in an internal flash memory, not shown.

On the other hand, the front panel 3 is so configured as to delete contents data recorded in an internal flash memory, or reproduce the contents data to transfer thus reproduced contents data to a terminal apparatus from the USB connector 25.

(2) Circuit Configuration of the Front Panel

Figure 3:
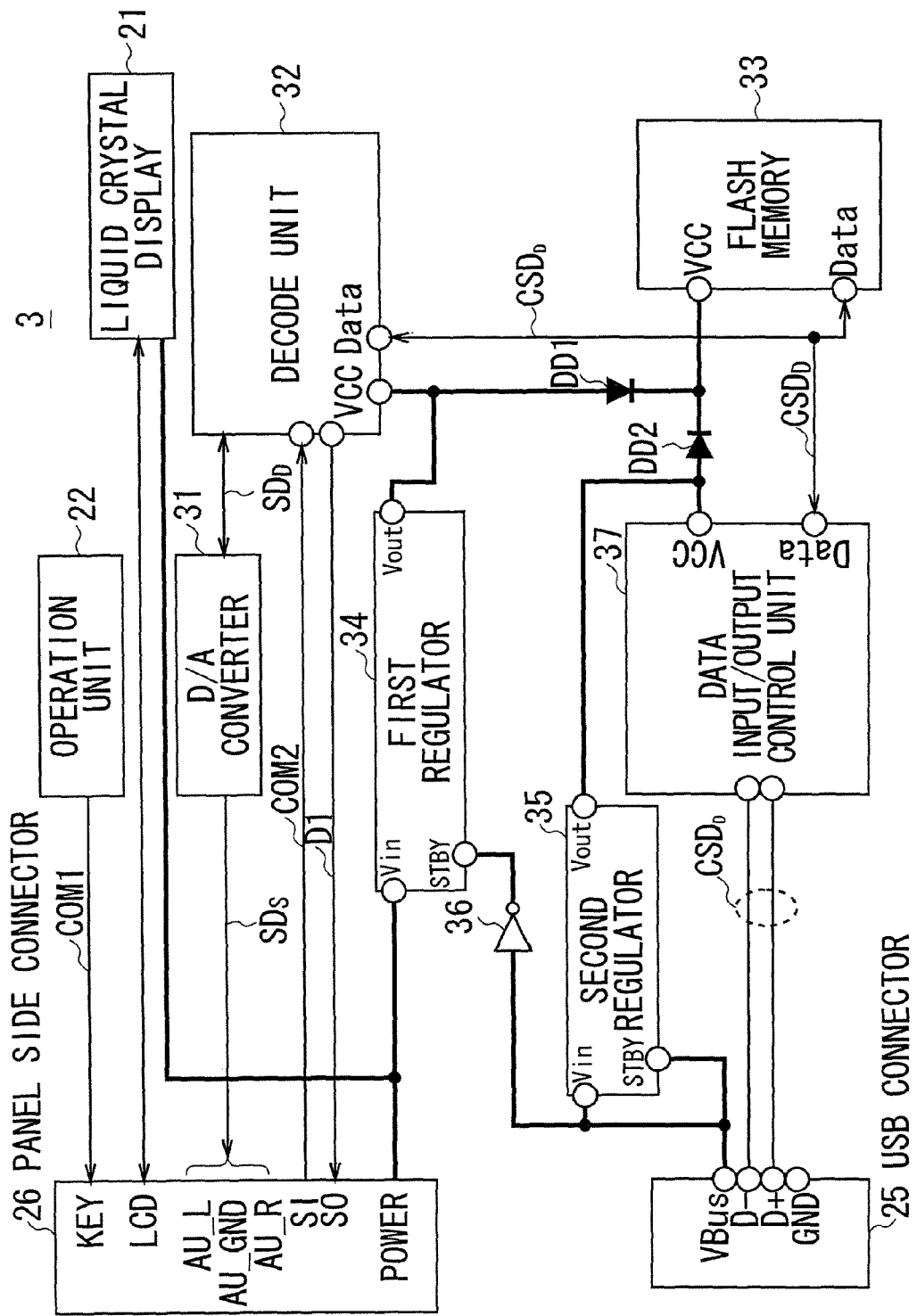
FIG. 3 shows a block diagram indicative of the circuit configuration of the front panel.

Next, the circuit configuration of the front panel 3 will be explained. As shown in FIG. 3, in which parts or components similar to those shown in FIG. 1 and FIG. 2 are indicated with the same reference numerals, terminals "LCD" and "KEY" of a panel side connector 26 arranged on the panel side mounting surface 3A shown in FIG. 1 are connected to the liquid crystal display 21 and the operation unit 22, respectively.

Furthermore, the panel side connector 26 is provided with output terminals for outputting contents data, and, in this embodiment, output terminals for outputting sound data for two channels and a ground terminal "AU_L", "AU_R", "AU_GND" are employed as output terminals for outputting contents data. These output terminals are connected to a decode unit 32 through a D/A (Digital/Analog) converter 31.

This decode unit 32 performs the expansion processing conforming to a predetermined compression system for contents data, and, in this embodiment, a decode unit that performs the expansion processing conforming to the audio compression system or the Moving Picture Experts Group Layer-3 (MP3) and the Windows (Registered Trademark) Media Audio (WMA) is employed. Furthermore, the decode unit 32 is connected to input and output terminals "SI" and "SO" for inputting and outputting commands of the panel side connector 26, and is also connected to a flash memory 33.

Furthermore, a power terminal "POWER" of the panel side connector 26 is connected to the liquid crystal display 21, and is also connected to the decode unit 32 through an input terminal "Vin" and an output terminal "Vout" of a first regulator 34, the output terminal "Vout" being connected to the flash memory 33 through a backflow-preventing diode DD1.

On the other hand, a power terminal "VBus" of the USB connector 25 arranged on the lower surface 3E is connected to an input terminal "Vin" and a standby terminal "STBY" of a second regulator 35, and is also connected to a standby terminal "STBY" of the first regulator 34 through a logical negation circuit 36.

In addition, the power terminal "VBus" of the USB connector 25 is connected to a data input/output control unit 37 through the input terminal "Vin" and an output terminal "Vout" of the second regulator 35, the output terminal "Vout" being connected to the flash memory 33 through a backflow-preventing diode DD2.

Furthermore, data input and output terminals "D−", "D+" of the USB connector 25 are connected to the flash memory 33 through the data input/output control unit 37.

In the front panel 3, in case no terminal apparatus is connected to the USB connector 25, and the main body side connector 12 shown in FIG. 1 is connected to the panel side connector 26, that is, the front panel 3 is connected to the main body 2, a power which is input from the main body 2 through the power terminal "POWER" of the panel side connector 26 is supplied to the liquid crystal display 21, and is also supplied to the decode unit 32 and to the flash memory 33 through the first regulator 34. A backflow to the data input/output control unit 37 and to the second regulator 35 is prevented by the backflow-preventing diode DD2.

In this case, the liquid crystal display 21 displays the display contents based on display data sent from the main body 2 through the terminal "LCD" of the panel side connector 26. On the other hand, the operation unit 22 sends a command "COM1" corresponding to input operation performed using the operation keys to the main body 2 through the terminal "KEY" of the panel side connector 26.

On the other hand, when receiving a command "COM2" through the input terminal "SI" from the main body 2, the decode unit 32 performs the processing corresponding to the command, and sends a response for the command to the main body 2 as response data D1.

For example, in case the command "COM2" is a reproduction command, the decode unit 32 reads out compressed sound data $CSD_D$ corresponding to the reproduction command from the flash memory 33, and performs the expansion processing in accordance with a corresponding system for the compressed sound data $CSD_D$, and sends thus obtained sound data $SD_D$ to the D/A converter 31. In this case, the sound data $SD_D$ is converted to a sound signal $SD_S$ by the D/A converter 31, and the sound signal $SD_S$ is sent to the main body 2 through the output terminals "AU_L", "AU_R" of the panel side connector 26.

Furthermore, for example, in case the command "COM2" is a deletion command, the decode unit 32 deletes compressed sound data $CSD_D$ corresponding to the deletion command from the flash memory 33.

In this way, in case no terminal apparatus is connected to the USB connector 25, and the front panel 3 is mounted to the main body 2, the front panel 3 reproduces or deletes compressed sound data $CSD_D$ recorded in the flash memory 33 according to the operation by the operation unit 22, and displays the operation contents by the operation unit 22 and the reproduction state of the compressed sound data $CSD_D$ on the liquid crystal display 21.

Furthermore, in the front panel 3, when the main body side connector 12 shown in FIG. 1 is not connected to the panel side connector 26, that is, the front panel 3 is dismounted from the main body 2, in case a terminal apparatus is connected to the USB connector 25 through a USB cable, a power which is input from the terminal apparatus through the power terminal "VBus" of the USB connector 25 is supplied to the data input/output control unit 37 and to the flash memory 33 through these second regulator 35. A backflow to the decode unit 32 and to the first regulator 34 is prevented by the backflow-preventing diode DD1.

In this case, the data input/output control unit 37 is so configured as to record the compressed sound data $CSD_D$ which is sent from the terminal apparatus through a USB cable and supplied from the data input and output terminals "D−", "D+" of the USB connector 25 to the flash memory 33, and delete the compressed sound data $CSD_D$ recorded in the flash memory 33.

The data input/output control unit 37 is so configured as to reproduce the compressed sound data $CSD_D$ recorded in the flash memory 33, and transfer thus reproduced data to a terminal apparatus from the data input and output terminals "D−", "D+" through a USB cable.

As described above, in case the front panel 3 is dismounted from the main body 2, and a terminal apparatus is connected to the USB connector 25, the front panel 3 records the compressed sound data $CSD_D$ to the flash memory 33, and deletes the compressed sound data $CSD_D$ recorded in the flash memory 33 or transfers the compressed sound data $CSD_D$ to the terminal apparatus.

At this time, the front panel 3 suspends supplying a power to the liquid crystal display 21, operation unit 22, and decode unit 32 which are not involved with the processing of recording and reproducing data to and from the flash memory 33 so as to reduce the power consumption.

Furthermore, in the front panel 3, when the main body side connector 12 shown in FIG. 1 is connected to the panel side connector 26, that is, when the front panel 3 is mounted to the main body 2, in case a terminal apparatus is connected to the USB connector 25, a power which is input from the terminal apparatus through the power terminal "VBus" of the USB connector 25 is supplied to the standby terminal "STBY" of the first regulator 34 through the logical negation circuit 36, turning on the standby terminal "STBY".

As a result, a power that is input from the main body 2 through the panel side connector 26 is not supplied to the liquid crystal display 21, decode unit 32, and flash memory 33, and a power that is input from the terminal apparatus through the power terminal "VBus" of the USB connector 25 is supplied to the data input/output control unit 37 and to the flash memory 33 through the second regulator 35.

Accordingly, in the front panel 3 in this case, the operation unit 22 is not able to operate the processing of reproducing or deleting the compressed sound data $CSD_D$ recorded in the flash memory 33, and priority is given to the operation by the terminal apparatus connected to the USB connector 25.

In this way, in case both the panel side connector 26 and the USB connector 25 are connected to their counterparts, using a power of the USB connector 25 by giving priority thereto, the front panel 3 accepts the operation by the terminal apparatus connected to the USB connector 25 without accepting the operation by the operation unit 22.

(3) Operation and Effect in the Embodiment

In above-described configuration, the in-vehicle reproduction apparatus 1 includes the main body 2, and the front panel 3 that is detachable with respect to the main body 2, the front panel 3 having arranged therein the flash memory 33.

The flash memory 33 is connected to the panel side connector 26 that is connected to the main body side connector 12 of the main body 2, and to the USB connector 25, and the data input/output control unit 37 that controls the data inputting and outputting processing in the USB connector 25 with respect to the flash memory 33 is arranged between the flash memory 33 and the USB connector 25.

In the in-vehicle reproduction apparatus 1, in case a terminal apparatus is connected to the USB connector 25 of the front panel 3, the data input/output control unit 37 writes compressed sound data $CSD_D$ which is input from the terminal apparatus through the USB connector 25 to the flash memory 33 in accordance with the compressed sound data $CSD_D$ and a write instruction therefor. On the other hand, the data input/output control unit 37 reads out corresponding compressed sound data $CSD_D$ in accordance with a read instruction which is input from the terminal apparatus through the USB connector 25 to output thus read out compressed sound data $CSD_D$ to the terminal apparatus.

Accordingly, the in-vehicle reproduction apparatus 1 is configured such that the front panel 3 which is dismounted from the main body 2 can be preserved at a place distant from a vehicle so as to prevent the front panel 3 from being stolen. Furthermore, in case of preserving the front panel 3, not only the front panel 3 can be preserved but also the front panel 3 can write and read out the compressed sound data $CSD_D$ to be reproduced by the main body 2 to and from the flash memory 33 in the front panel 3.

In this respect, according to the in-vehicle sound reproduction apparatus disclosed in the patent document 1, even if a commander is detachably configured, the other front panel component remains mounted. Accordingly, in case the user of a vehicle having mounted therein the in-vehicle sound reproduction apparatus parks the vehicle and gets away therefrom, the in-vehicle sound reproduction apparatus itself is in danger of being stolen.

Furthermore, according to the in-vehicle sound reproduction apparatus, since a memory is arranged in a detachable commander, the intended use of the commander is a portable memory rather than a component of the in-vehicle sound reproduction apparatus. In recent days when portable memories are put into circulation, as an in-vehicle sound reproduction apparatus, a configuration in which a memory slot is formed at the main body side can prevent the in-vehicle sound reproduction apparatus from being unnecessarily complicated since the configuration as an in-vehicle sound reproduction apparatus can be kept intact.

Moreover, in case of employing a configuration in which a front panel of an in-vehicle sound reproduction apparatus is made to be detachable, and a memory slot is formed at a predetermined position of the front panel, when the front panel is detached from the in-vehicle sound reproduction apparatus, the intended use is only preserving the front panel, the configuration being not different from that in the past.

On the other hand, according to the in-vehicle reproduction apparatus 1, since the front panel 3 is a detachable component with respect to the main body 2, the front panel 3 can be used as the antitheft as well as portable flash memory 33 without making the mechanical structure of the detachable component operate individually or differently from the other structure.

Furthermore, in the front panel 3, between the panel side connector 26 and the flash memory 33, there is arranged the decode unit 32 that decodes the compressed sound data $CSD_D$ read out from the flash memory 33, and outputs thus decoded sound data $SD_D$ to the main body side connector 12.

Accordingly, as compared with a case in which the decode unit 32 is not arranged, the in-vehicle reproduction apparatus 1 can reduce the number of terminals in the main body side connector 12 and panel side connector 26, which can make it possible to reduce the number of parts of the main body side connector 12 and panel side connector 26.

Furthermore, as switching elements to switch the power lines, or to make the power line between the power terminal of the USB connector 25 and the flash memory 33 take priority over the power line between the power terminal of the panel side connector 26 and the flash memory 33, the front panel 3 is provided with the first regulator 34, second regulator 35, and logical negation circuit 36.

Accordingly, in this in-vehicle reproduction apparatus 1, the property of arranging the flash memory 33 in the front panel 3 can be preferentially used.

According to above-described configuration, since the front panel 3 is a detachable component with respect to the main body 2, the front panel 3 can be used as the antitheft as well as portable flash memory 33 without making the mechanical structure of the detachable component operate individually or differently from the other structure, making it possible to realize the in-vehicle reproduction apparatus 1 that is of uncomplicated configuration and can improve usability.

(4) Other Embodiments

In above-described configuration, as a decode unit, the decode unit 32 that decodes the compressed sound data $CSD_D$ corresponding to the audio compression encoding system referred to as the Moving Picture Experts Group Layer-3 (MP3) and the Windows (Registered Trademark) Media Audio (WMA) is employed. On the other hand, the present invention may change part or the entirety of the system of the aforementioned embodiment, or add another system, and employ a decode unit that decodes compressed sound data corresponding to the audio compression encoding system of various types such as the Adaptive Transform Acoustic Coding (ATRAC) or the Ogg Vorbis.

Furthermore, instead of the decode unit 32, or in addition, a decode unit that decodes compressed image (moving picture or still picture) data corresponding to the image compression encoding system referred to as the MPEG or Joint Photographic Experts Group (JPEG) may be employed.

In above-described embodiment, no explanation is given concerning the decode processing for data recorded on an optical disc loaded in the main body 2. In this respect, a decode unit for data recorded on the optical disc may be arranged in the main body 2 in addition to the decode unit 32, or the decode unit 32 may be shared. Furthermore, in case of arranging another decode unit different from the decode unit 32 in the main body 2, a decode unit that decodes compressed image data may be employed, or a decode unit that decodes compressed sound data similar to the decode unit 32 may be employed.

Furthermore, in above-described embodiment, in the panel side connector 26, output terminals for outputting sound data for two channels and a ground terminal "AU_L", "AU_R", "AU_GND" are employed as output terminals for outputting contents data. On the other hand, the present invention is not restricted to this, and output terminals for outputting sound data for 5.1 channels and a ground terminal may be employed, and output terminals for outputting image data may be added thereto.

The present invention can be employed in an in-vehicle apparatus that has its front panel detachably configured.

It should be understood by those skilled in the art that various modifications, combinations, sub-combinations and alterations may occur depending on design requirements and other factors insofar as they are within the scope of the appended claims or the equivalents thereof.

What is claimed is:

1. An in-vehicle apparatus that includes a reproduction apparatus main body to be mounted in a vehicle, and a front panel which is detachable with respect to the reproduction apparatus main body, the front panel comprising:
   a first connecting unit that is connected to the reproduction apparatus main body, the first connecting unit including a first power terminal configured to receive power from the reproduction apparatus main body;
   a memory that is connected to the first connecting unit;
   a second connecting unit that is connected to the memory, and is connected to a signal input/output apparatus, the second connecting unit including a second power terminal configured to receive power from the signal input/output apparatus;
   a control unit that is arranged between the memory and the second connecting unit, and controls inputting and outputting of a signal in the second connecting unit with respect to the memory; and
   a switch that includes
      a first regulator that is arranged between the first power terminal and the memory,
      a second regulator that is arranged between the second power terminal and the memory as well as the control unit, and
      a logical negation circuit that is arranged between a standby terminal of the first regulator and the second power terminal.

2. The in-vehicle apparatus according to claim 1, wherein the front panel further includes a decode unit that is arranged between the first connecting unit and the memory, and decodes compressed audio data read out from the memory to output thus decoded audio data to the first connecting unit.

3. The in-vehicle apparatus according to claim 1, wherein the switch is configured to provide power to the second connecting unit and the memory through the second power terminal and to disconnect power between the first power terminal and the memory when the second connecting unit is connected to the signal input/output apparatus.

4. A front panel which is detachable with respect to a reproduction apparatus main body to be mounted in a vehicle, comprising:
   a first connecting unit that is connected to the reproduction apparatus main body, the first connecting unit including a first power terminal configured to receive power from the reproduction apparatus main body;
   a memory that is connected to the first connecting unit;
   a second connecting unit that is connected to the memory, and is connected to a signal input/output apparatus, the second connecting unit including a second power terminal configured to receive power from the signal input/output apparatus;
   a control unit that is arranged between the memory and the second connecting unit, and controls inputting and outputting of a signal in the second connecting unit with respect to the memory; and
   a switch that includes
      a first regulator that is arranged between the first power terminal and the memory,
      a second regulator that is arranged between the second power terminal and the memory as well as the control unit, and
      a logical negation circuit that is arranged between a standby terminal of the first regulator and the second power terminal.

5. The front panel according to claim 4, further comprising a decode unit that is arranged between the first connecting unit and the memory, and decodes compressed audio data read out from the memory to output thus decoded audio data to the first connecting unit.

6. The front panel according to claim 4, wherein
   the switch is configured to provide power to the second connecting unit and the memory through the second power terminal and to disconnect power between the first power terminal and the memory when the second connecting unit is connected to the signal input/output apparatus.

* * * * *